No. 841,355. PATENTED JAN. 15, 1907.
W. THOMAS.
DEVICE FOR MARKING THE LENGTHS OF RAILS OR THE LIKE.
APPLICATION FILED JUNE 8, 1906.

Witnesses
Albert Peter
Ludwig Grosse

Inventor
Wilhelm Thomas
By Wilhelm Kirchbaum
Attorney

UNITED STATES PATENT OFFICE.

WILHELM THOMAS, OF DUISBURG-MEIDERICH, GERMANY.

DEVICE FOR MARKING THE LENGTHS OF RAILS OR THE LIKE.

No. 841,355.  Specification of Letters Patent.  Patented Jan. 15, 1907.

Application filed June 8, 1906. Serial No. 320,920.

*To all whom it may concern:*

Be it known that I, WILHELM THOMAS, a subject of the German Emperor, and a resident of Duisburg-Meiderich, Germany, have invented certain new and useful Improvements in Devices for Marking the Length of Rails or the Like, of which the following is a specification.

This invention relates to a device for marking the length of rails or the like, which is represented on the accompanying drawings, in which—

Figure 1:
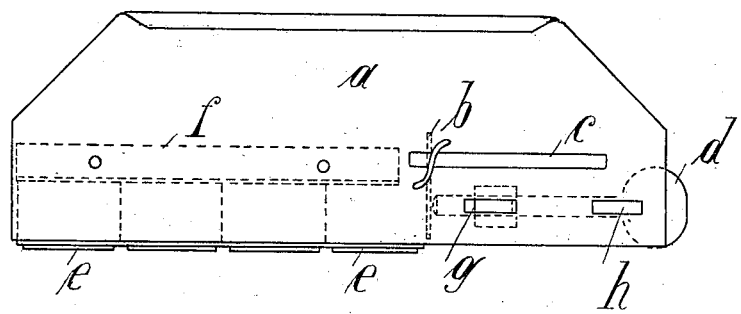
Figure 2:
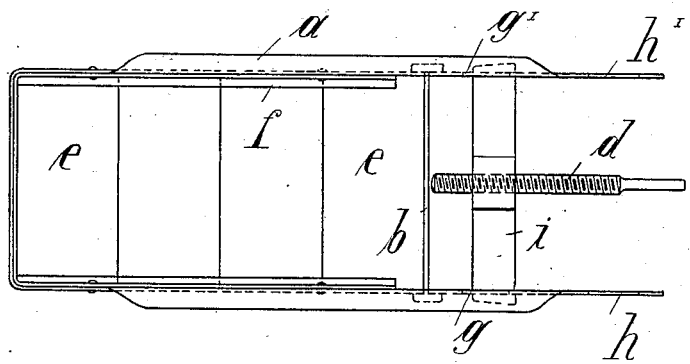
Figure 3:
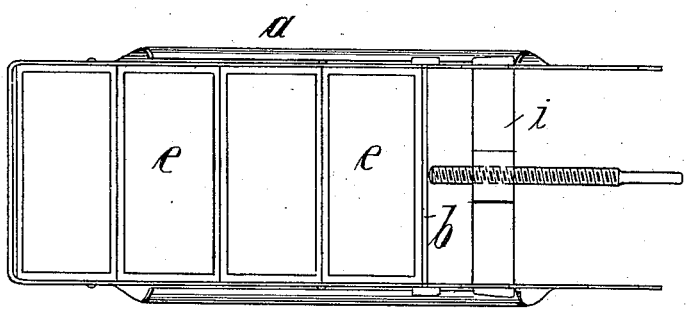

Figure 1 is a side view, Fig. 2 a plan, and Fig. 3 an under side plan, of the same.

Hitherto it was usual to have the length of rails or the like marked by hand in providing the rails first with one type and then in succession with the others, which is of course very cumbersome and gives no accurate number, as the distance between the single types could not be possibly absolutely equal, while their position did not always come out exactly parallel and in line to each other. To attain now an exactly accurate marking of the rails or the like, the new device is provided.

In the open casing $a$ an adjustable vertical plate $b$ is arranged and adapted to be guided in the horizontal slot $c$ of the casing. A screw $d$, adapted to act on the plate $b$, serves for fastening the types $e$ in the casing, while ledges $f$ prevent the types from moving upward. Slots $g$ $g'$ and $h$ $h'$, respectively, are provided in the side walls of the casing and adapted to receive the removable guide-piece $i$ of the screw $d$, whereby fewer or more types can be fixed in the casing The device is used as follows: The respective types are set in the apparatus in the right succession and fixed in the casing by means of the screw $d$. The casing is open at the top, so as to set the types in exact position. To handle the casing, the side walls of the same are bent outward at the top edge or the casing may be provided with separate handles.

Having fully described my invention, what I claim, and desire to secure by Letters Patent, is—

Device for marking the length of rails or the like, comprising in combination a casing $a$ provided at its side walls with a horizontal slot $c$ and with opposite slots $g$, $g'$ and $h$, $h'$ respectively, a vertical plate $b$ arranged adjustably in said casing and adapted to be guided in said slot $c$ of said casing, types $e$ placed in said casing, a screw $d$ provided in said casing and adapted to act upon said vertical plate $b$ and thus to fasten said types $e$ in said casing, a removable guide-piece $i$ for said screw adapted either to be set in said slots $g$, $g'$ or in said slots $h$, $h'$, and ledges $f$ provided in said casing and adapted to prevent said types from moving upward, substantially as described and shown.

In testimony whereof I have hereunto set my hand in the presence of two subscribing witnesses.

WILHELM THOMAS.

Witnesses:
 WILLIAM ESSENWEIN,
 ALFRED POHLMEYER.